(12) United States Patent
Kalenborn (10) Patent No.: US 9,856,838 B2
(45) Date of Patent: Jan. 2, 2018

(54) DUAL FUEL FUEL-INJECTOR (71) Applicant: L'Orange GmbH, Stuttgart (DE)

(72) Inventor: Markus Kalenborn, Dornstadt (DE)

(73) Assignee: L'Orange GmbH, Stuttgart (DE)

( * ) Notice: Subject to any disclaimer, the term of this patent is extended or adjusted under 35 U.S.C. 154(b) by 0 days.

(21) Appl. No.: 15/410,193

(22) Filed: Jan. 19, 2017

(65) Prior Publication Data
US 2017/0130685 A1 May 11, 2017

Related U.S. Application Data (63) Continuation of application No. PCT/EP2015/001387, filed on Jul. 8, 2015.

(30) Foreign Application Priority Data

Jul. 19, 2014 (DE) .......... 10 2014 010 716

(51) Int. Cl.
    *F02B 3/00* (2006.01)
    *F02M 43/04* (2006.01)
    *F02D 19/06* (2006.01)

(52) U.S. Cl.
    CPC ......... *F02M 43/04* (2013.01); *F02D 19/0694* (2013.01)

(58) Field of Classification Search
    CPC ............... F02D 41/40; F02D 2041/389; F02D 41/3094; F02M 61/14; F02M 51/061; F02M 51/066
    USPC ....... 123/299, 305, 445, 446, 447, 468, 472, 123/478, 480, 490; 239/5, 124, 127, 239/585.1, 585.5, 533.2–533.4, 533.9
    See application file for complete search history.

(56) References Cited

U.S. PATENT DOCUMENTS

| | | |
|---|---|---|
| 4,612,898 A | 9/1986 | Steiger et al. |
| 2014/0196687 A1 | 7/2014 | Coldren et al. |
| 2016/0245194 A1* | 8/2016 | Kalenborn ............. F02M 43/04 |

(Continued)

FOREIGN PATENT DOCUMENTS

| | | |
|---|---|---|
| DE | 10 2013 017 853 A1 | 4/2015 |
| GB | 2 270 346 A | 3/1994 |

(Continued)

OTHER PUBLICATIONS

International Search Report dated Sep. 7, 2015 for International Application No. PCT/EP2015/001387 (2 pages).

*Primary Examiner* — John Kwon
(74) *Attorney, Agent, or Firm* — Taylor IP, P.C.

(57) ABSTRACT

A dual fuel fuel-injector including a first nozzle body having a plurality of respective receptacles, a plurality of nozzle needles, each having a stroke that is controllable by a control fluid and at least one associated control chamber. The plurality of nozzle needles include a plurality of first nozzle needles, each being axially displaceable in the first nozzle body of the dual fuel fuel-injector for selective discharge of a first fuel, whereby the plurality of first nozzle needles are arranged in the first nozzle body in the plurality of respective receptacles. The dual fuel fuel-injector also includes a mixed leakage collecting channel communicatively connected to the plurality of respective receptacles, and a mixed leakage discharge channel on the dual fuel fuel-injector and in communication with the mixed leakage collecting channel.

20 Claims, 4 Drawing Sheets (56) References Cited

U.S. PATENT DOCUMENTS

2016/0319754 A1* 11/2016 Kalenborn ............. F02M 43/04
2017/0002780 A1* 1/2017 Kalenborn ......... F02M 63/0045
2017/0107958 A1* 4/2017 Kalenborn ............. F02M 43/04
2017/0218897 A1* 8/2017 Kalenborn ........... F02M 37/221
210/335

FOREIGN PATENT DOCUMENTS

WO 2014/106525 A1 7/2014
WO 2015/090494 A1 6/2015

* cited by examiner

DUAL FUEL FUEL-INJECTOR

CROSS REFERENCE TO RELATED APPLICATIONS

This is a continuation of PCT application No. PCT/EP2015/001387, entitled "DUAL FUEL FUEL-INJECTOR", filed Jul. 8, 2015, which is incorporated herein by reference.

BACKGROUND OF THE INVENTION

1. Field of the Invention

The present invention relates to fuel injectors, and, more particularly, to a dual fuel fuel-injector 1. The dual fuel fuel-injector can be used, for example, with pilot injection engines, including the type that in addition to pilot injection operation with burnable fuel (and a diesel or heavy oil pilot injection) provide a pure diesel or heavy oil operation. Instead of heavy oil, bio-oil or bio fuel may be used.

2. Description of the Related Art

Gaseous fuels are increasingly gaining importance in the (large) engine sector, in particular with stationary engines for power generation. Natural gas for example, is ideally suited for economical and environmentally friendly engine operation due to its excellent availability and its excellent emission potential compared to diesel fuel.

With dual fuel fuel-injectors of this type, including indirectly controlled injectors (according to the known control principle of "pilot valve-actuator-control chamber") that use liquid fuel as the control fluid not only for control of a liquid fuel nozzle needle, but also for control of at least one gas nozzle needle, leakage occurs regularly, generally on the guides of the gas nozzle needles. Especially in the case of multi-component multi-needle nozzles, the necessity of collecting and discharging such gas-containing liquid leakage from the fuel injector causes considerable constructional effort.

What is needed in the art is a dual fuel fuel-injector on which treatment of mixed leakage is easily possible from a design point of view.

SUMMARY OF THE INVENTION

The present invention provides a dual fuel fuel-injector which may be used with a first fuel in the form of a liquid fuel, for example diesel fuel, bio fuel or heavy oil and in addition for use with a second fuel in the form of a gaseous fuel or burnable fuel, for example natural gas. The dual fuel fuel-injector can be provided for pilot-injection operation of an internal combustion engine (liquid fuel pilot-injection for ignition of the gaseous fuel), and in addition also for an exclusive liquid fuel operation. The dual fuel fuel-injector is intended for use, for example, with a large engine, for example in a motor vehicle such as a ship or a utility vehicle, or in a stationary device, for example for a cogeneration unit, for a (emergency) power generator, for example also for industrial applications.

The dual fuel fuel-injector includes numerous nozzle needles whose strike is controllable via the control fluid and an associated control chamber. The control fluid—for indirect control of the needle stroke as provided by the invention, according to the principle "control chamber-actuator-pilot valve" is herein liquid fuel (usable with the dual fuel fuel-injector).

Included in the nozzle needles of the dual fuel fuel-injector is multiple first nozzle needles, for example 2, 3, 4 or more first nozzle needles that are arranged in a first nozzle body of the dual fuel fuel-injector, each for selective delivery of a first fuel. The first nozzle needles can deliver a gaseous first fuel, such as natural gas, in this respect representing for example gas nozzle needles.

The thus designed dual fuel fuel-injector includes a mixed leakage collecting channel that connects receptacles (of the first nozzle needles) in a communicating manner, for example, two or more receptacles, or all of the receptacles (of first nozzle needles). In other words, the mixed leakage collecting channel may be a common collecting channel for the receptacles.

Within the scope of the current invention the mixed leakage collecting channel can serve the collection of mixed leakage, generally the mixed leakage treatment on the dual fuel fuel-injector. The mixed leakage consists regularly of mixed control fluid and first fuel (e.g. burnable fuel) whereby the leakage can occur at the respective receptacles of the first nozzle needles (along respective slow leakage paths, progressing from a nozzle-near needle end to a respective needle end remote from the nozzle).

Also located on the dual fuel fuel-injector, for example, on the first nozzle body is a mixed leakage discharge channel that is in communication with the mixed leakage collecting channel. Within the scope of the mixed leakage treatment, the mixed leakage can be transferred via the discharge channel—that is, for example, in the embodiment of a bore—from the mixed leakage collecting channel into an injector housing, for example for discharge from the dual fuel fuel-injector.

Within the scope of a fuel system or fuel injection system the discharge channel (discharge side) can be directed to a pressure regulating device or can communicate with such, by means of which within the scope of the mixed leakage treatment in addition to a discharge from the mixed leakage collecting channel, for example also the adjustment of a target pressure level in the mixed leakage collection channel is made possible. A pressure regulating device of this type, including associated possibilities in mixed leakage treatment that are at least partially also applicable for the current invention are disclosed in another application by the applicant of the current invention and can be found under file DE 10 2013 017 853.3, the disclosure content of which is herein included by reference.

The dual fuel fuel-injector designed in this manner evidently opens up a mixed leakage treatment for first nozzle needles with the possibility of structurally simple design.

Within the scope of the current invention, the first nozzle needles are arranged in the first nozzle body which may be distributed in a circumferential direction of the first nozzle body, in the manner of a rotary magazine. The first nozzle needles may be arranged at equal distances from one another in circumferential direction, so that a uniform delivery of first fuel into a combustion chamber can be achieved with complete coverage around 360°. In further development of the invention, in an arrangement where the nozzle needles are arranged distributed in circumferential direction of the first nozzle body the mixed leakage collecting channel is designed as an annular channel which connects for example all receptacles in a communicating manner.

In a further design of the invention, the plurality of nozzle needles of the dual fuel fuel-injector moreover includes a second nozzle needle that is arranged in a second nozzle body of the dual fuel fuel-injector for selective delivery of a second fuel, such as a liquid fuel (which also serves as the control fluid for the first nozzle needles).

It should be noted that embodiments having a second nozzle body offer the possibility within the scope of the invention of defining the mixed leakage collecting channel via the first and second nozzle body—simply at the interfaces of the same. The mixed leakage collecting channel may be created for example by an indentation or recess that is introduced into a circumferential surface of one of the nozzle bodies of the first and second nozzle body and is covered or closed on an open side by the further nozzle body of the first and second nozzle body, which may be an (outer) circumferential surface or shell surface of the second nozzle body. The indentation may be an easily produced groove or, in the case of a circular mixed leakage collecting channel or annular channel, a circumferential groove.

Within the scope of the invention, the second nozzle body is for example a central nozzle body that is surrounded for example over a section by the first nozzle body with the therein located first nozzle needles. With such preferred concentric arrangement, the first nozzle body has in this respect a ring shaped cross section. Due to the fact that the indentation forming the mixed leakage collecting channel can be introduced into an easily accessible (inside) circumferential surface or shell surface of the first nozzle body, inventive solutions for the design of the duel fuel fuel-injection are achieved.

To achieve good control of the first nozzle needles in the receptacles which communicate with one another, the mixed leakage collecting channel may be located in a longitudinally central region of the receptacles. The nozzle needle can thus be placed above (remote from the nozzle) as well as below (nozzle-near) the mixed leakage collecting channel over a section, for example continuously in the receptacle.

In an alternative design that permits another needle control in addition to simple structural implementation, the mixed leakage collecting channel can moreover be defined between the first nozzle body and a cover plate (remote from the nozzle) on the first nozzle body. The cover plate may, for example, be arranged as an intermediate plate between the first and the second nozzle body, or may also be formed directly by the second nozzle body.

With the current invention, embodiments of the dual fuel fuel-injector are generally provided, whereby the mixed leakage collecting channel communicates to produce radial recesses and/or bores with the receptacles that are connected therewith in a communicating manner, as well as embodiments whereby the mixed leakage channel intersects the receptacles of the first nozzle needles that are connected in a communicating manner, for example directly.

In addition to the mixed leakage collecting channel a mixed leakage collecting chamber—increasing the collecting volume—can be provided at a respective first nozzle needle and/or receptacle (communicating with the receptacle), via which chamber the receptacles are connected via the mixed leakage collecting channel in a communicating manner.

In embodiments where the mixed leakage collecting channel is arranged on the first nozzle body, on the front or more specifically at the end away from the nozzle, a mixed leakage collecting chamber can be provided on a respective receptacle which is connected in a communicating manner with the mixed leakage collecting channel and which can be established at the end away from the nozzle of the first nozzle needle that is accommodated in the receptacle (and in addition for example also around a needle guide sleeve arranged thereupon). This enables good control of the nozzle needle in the receptacle over a substantial part of its length, for example at the end remote from the nozzle, additionally via a needle guide sleeve and/or in addition a formation of the collecting channel via front-side material removal (on the first nozzle body) including simple formation of the mixed leakage collecting chamber as a cross-sectionally enlarged receptacle section ((step-)bore) and furthermore an optional dimensioning of the top end of the nozzle needles for simple provision of an intended control cross section for the (hydraulic) stroke control of the nozzle needle.

Additional embodiments can provide formation of a mixed leakage collecting chamber for example also additionally over a section of a respective receptacle of a gas nozzle needle and/or over a section of a respective gas nozzle needle, for example, via a cross section enlargement at the receptacle or a sectional tapering on a gas nozzle needle.

The invention also suggests an internal combustion engine, including the type referred to at the beginning that has at least one dual fuel fuel-injector as previously described. The dual fuel fuel-injector can be connected with a mixed leakage treatment device via the discharge channel, for example with a pressure regulating device of a mixed leakage treatment device as previously mentioned.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figures 1, 1A:
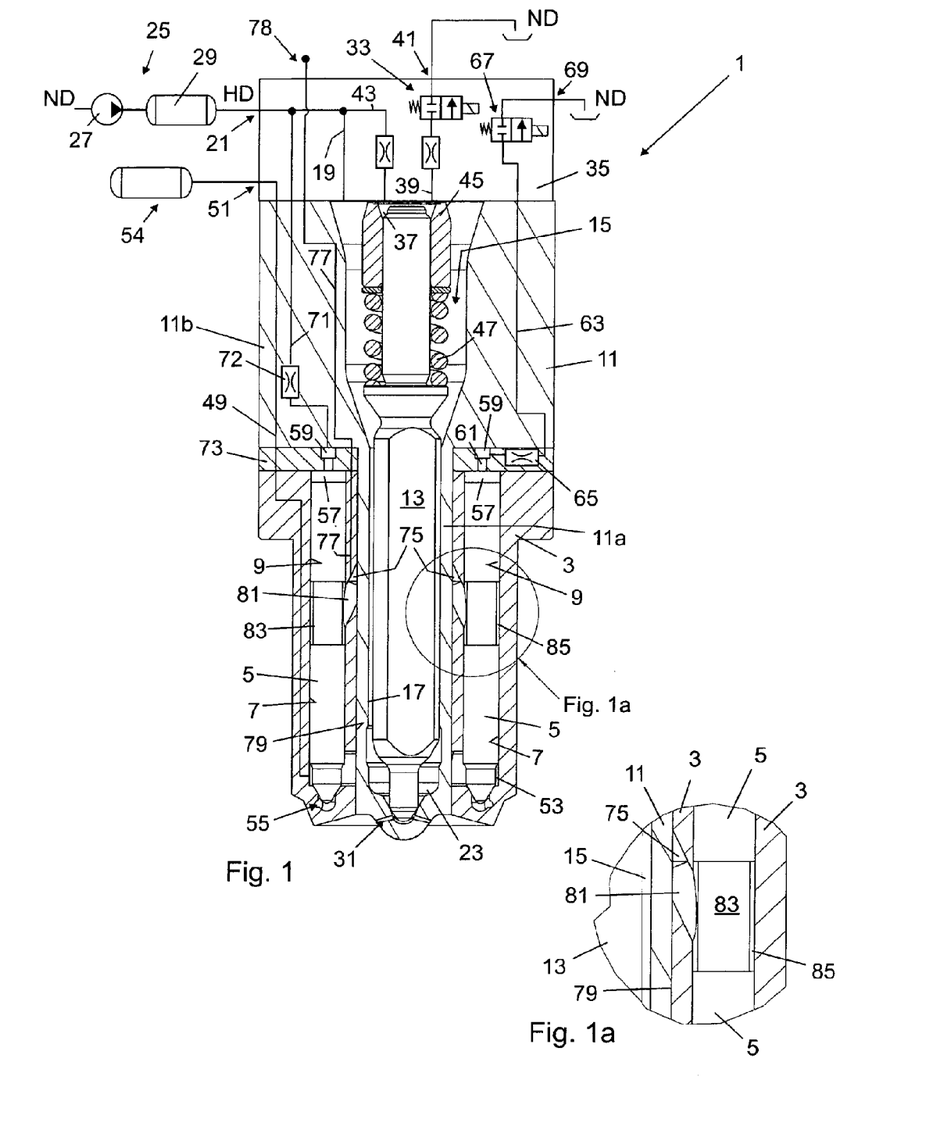
FIG. 1 illustrates a schematic and partially greatly simplified (sectional) view of a dual fuel fuel-injector according to an embodiment of the invention.
FIG. 1A is a detail view illustrating the embodiment as shown in FIG. 1.

Referring now to FIG. 1 there is shown an inventive dual fuel fuel-injector (dual fuel nozzle or more specifically dual fuel injector) 1 that can be provided for injection operation with a first liquid fuel (e.g. diesel fuel, bio fuel, or heavy oil) as well as for delivery of a second, gaseous fuel (burnable fuel, for example natural gas) for burnable fuel injection. Dual fuel fuel-injector 1 can be used with a dual fuel fuel-injection system, for example, with a gas common rail system, furthermore with an internal combustion engine which is arranged or pilot injection operation (with injected burnable fuel and injected liquid fuel pilot injection) as well as for exclusive liquid fuel operation via dual fuel fuel-injector 1.

Dual fuel fuel-injector 1 includes a (first) nozzle body 3 in which several first needles 5 are arranged axially movable. First nozzle needles 5 are provided for selective delivery of a first gaseous fuel, for example for delivery of burnable fuel (within the scope of a burnable fuel injection into a combustion chamber of an internal combustion engine) and in this respect are also referred to below as gas nozzle needles 5. Gas nozzle needles 5 are mounted and controlled axially movable in first nozzle body 3, respectively in an associated seat 7, created by a respective axial bore 9 in first nozzle body 3.

First nozzle needles 5 are arranged, for example equidistant, and distributed in first nozzle body 3 in circumferential direction of dual fuel fuel-injector 1 or more specifically of first nozzle body 3 that is along a circular path (whereby first nozzle body 3 is quasi in the embodiment of a rotary magazine for gas nozzle needles 5). In the illustrated dual fuel fuel-injector 1, four gas nozzle needles 5 are for example arranged in first nozzle body 3, distributed in circumferential direction, whereby advantageously uniform gas delivery into a combustion chamber can be achieved completely around 360°. Embodiments are also conceivable with two, three, five or another different number of gas nozzle needles 5.

Dual fuel fuel-injector 1 moreover includes one second nozzle body 11 in which one additional nozzle needle 13 is provided for injection processes that provide selective delivery of a second fuel, for example a liquid fuel (into a combustion chamber of an internal combustion engine). Second nozzle needle 13 that is subsequently referred to also as liquid fuel nozzle needle 13 is also axially stroke-controllable and mounted in a corresponding receptacle 15 of second nozzle body 11. The receptacle 15 of second nozzle body 11 is formed by an axial bore 17 in second nozzle body 11.

Dual fuel fuel-injector 1 moreover includes a high pressure channel 19 that leads from a liquid fuel inlet 21 of dual fuel fuel-injector 1 to a liquid fuel nozzle chamber 23 supplied by a high pressure (HD) supply device 25 of a fuel injection system, including for example of a high pressure pump 27 and a rail 29 and/or also a single pressure accumulator, for example originating from a liquid fuel storage, for example a tank.

For selective delivery of liquid fuel, dual fuel fuel-injector 1 is moreover designed to deliver high pressure liquid fuel that—depending on the (stroke) setting of second nozzle needle 13—is introduced into liquid fuel nozzle chamber 23 via a liquid fuel nozzle arrangement 31 of dual fuel fuel-injector 1. In an injection operation (for example pure liquid fuel operation or pilot-injection operation) the duel fuel fuel-injector 1 is designed in particular to inject into a combustion chamber of an internal combustion engine.

For stroke control of the second nozzle needle 13 within the scope of the fuel injection processes, dual fuel fuel-injector 1 that in the current example is operated indirectly actuated—as illustrated in FIG. 1—includes in particular a pilot valve (control or servo valve) 33 that can be controlled by a solenoid actuator (or for example a piezo actuator). Via pilot valve 33 that is accommodated with its actuator system in an injector housing 35, a control chamber 37 of dual fuel fuel-injector 1 that is associated with second nozzle needle 13 can be relieved depending upon valve position; via a leakage flow path 39 of the injector-internal fuel system. Originating from control chamber 37, leakage flow path 39 leads to a leakage outlet 41 on low pressure side (ND) of the dual fuel fuel-injector 1, that is via pilot valve (by throttling) 33, for example, to a leakage collecting tank.

In addition, a high pressure path 43 of the injector-internal fuel system (with throttling) leads to control chamber 37 for second nozzle needle 13, through which control chamber 37 is chargeable—via highly pressurized liquid fuel—originating from high pressure channel 19. Control chamber 37 is defined by a needle guide sleeve 45 (and injector housing 35). The needle guide sleeve 45 is accommodated at the nozzle-remote end of axial bore 17 in second nozzle body 11, whereby moreover a closing spring 47 can be arranged in axial bore 17 which pushes second nozzle needle 13 into the closed position, in other words against a valve seat or nozzle needle seat adjacent to liquid fuel nozzle arrangement 31.

In order to deliver liquid fuel in a liquid fuel fuel-injection operation through liquid fuel nozzle arrangement 31—for example via liquid fuel nozzle chamber 23—the (closing) balance of power at second nozzle needle 13 can be terminated through relief of control chamber 37 via pilot valve 33 (leakage flow path 39 open), so that second nozzle needle 13 can lift off the valve seat and can open the flow path to the spray holes of liquid fuel nozzle arrangement 31. In order to close the nozzle valve, pilot valve 33 is switched to the blocked position (see FIG. 1), following which the pressure in control chamber 37 is again built up via high pressure path 43 and second nozzle needle 13 returns into the needle seat aided by the closing spring force.

Liquid fuel may be used to charge and relieve control chamber 37 or for (hydraulic) stroke control of second nozzle needle 13.

For operation with gaseous fuel (natural gas, bio gas, etc.), dual fuel fuel-injector 1 comprises a high pressure gas channel 49 that leads from a burnable fuel inlet 51 on dual fuel fuel-injector 1 to a common nozzle chamber 53 for the plurality of first nozzle needles 5 (or alternatively to a plurality of branched gas nozzle chambers 53). Burnable fuel inlet 51 can be supplied via a supply arrangement 54 of a fuel injection system, for example at a pressure level to approx. 350 bar.

From nozzle chamber 53 highly pressurized burnable fuel that was introduced into same via high pressure gas channel 49 can be delivered depending on the stroke position of first nozzle needles 5. A respective flow path leading from gas nozzle chamber 53 to at least one gas nozzle opening associated with gas nozzle needle 5 of a gas nozzle arrangement 55 of dual fuel fuel-injector 1 can hereby be selectively closed via a respective gas nozzle needle 5. In regard to gas nozzle arrangement 55, one or several, for example two each gas nozzle openings can herein be assigned to a respective first gas nozzle needle 5 which can be opened selectively by the same.

For stroke control of the plurality of gas nozzle needles 5, dual fuel fuel-injector 1 is configured analog to the operating principle described previously for stroke control of liquid fuel nozzle needle 13, for example for indirect control of first nozzle needles 5. In this respect—as illustrated in FIG. 1—each of the first nozzle needles 5 on dual fuel fuel-injector 1 has allocated to it a control chamber 65 for activation with a control fluid. The control fluid for indirect control of gas nozzle needles 5—as is the case for liquid fuel nozzle needle 13—is the liquid fuel that is supplied to dual fuel fuel-injector 1 via liquid fuel inlet 21.

In order to be able to control gas nozzle needles 5 advantageously, easily, and moreover in totality and synchronously, dual fuel fuel-injector 1 includes a control channel 59 that is provided as a common pre-control chamber for the first nozzle needles 5 and which can be charged and relieved via the control fluid (liquid fuel). Control chambers 57 for first nozzle needles 5 are connected in a communicating manner with control channel 59, that is, in each case via an inlet throttle device, formed for example by a throttle bore 61. An outlet branch 63 for relief of control channel 59, and consequently for common relief of control chambers 57 of first nozzle needles 5 is via side of control channel 59 over an outlet throttle device 65 toward the low-pressure side (ND).

In addition to the stroke control of first nozzle needle 5 via selective relief of control channel 59 or more specifically control chambers 57 of first nozzle needles 5—analog to the liquid fuel operation—an additional pilot valve (control valve) 67 can be provided on dual fuel fuel-injector 1. Additional pilot valve 67 (including its actuators) is also accommodated in injector housing 35. Depending on the valve position of additional pilot valve 67, control channel 59 can be discharged via control fluid outlet 63 which is controlled via additional pilot valve 67, that is to low pressure side (ND) leakage outlet 69, for example to a leakage collection tank.

To now deliver burnable fuel for a burnable fuel injection operation via second gas nozzle arrangement 55, i.e. via gas nozzle chamber 53, the (closing) balance of power on a respective first nozzle needle 5 can be terminated through relief of control channel 59 and to that extent of respective control chamber 57 for first nozzle needle 5 that is connected in a communicating manner via additional pilot valve 67 (outlet 63 open), so that respective first nozzle needle 5 can lift off a valve seat and can open the flow path to a nozzle opening on gas nozzle arrangement 55. To close the nozzle valve, additional pilot valve 67 is switched into the locked position (see FIG. 1), as a consequence of which the pressure in control channel 59 and in this respect, in control chamber 57 for first nozzle needle 5 that is connected in a communicating manner builds up again via a liquid fuel high pressure path 71 with an infeed throttle 72, and respective first nozzle needle 5 returns to the needle seat aided by the spring force.

According to FIG. 1 and favoring a compact arrangement, second nozzle body 11 has a stepped profile, that is with a first nozzle-near segment 11A and in contrast with a second cross section enhanced segment 11B, remote from the nozzle. First nozzle body 3—that has a ring-shaped cross section—surrounds the first cross section adapted segment 11A of second nozzle body 11, whereby—viewed in axial direction—between first 3 and second 11 nozzle body an element 73 in the embodiment of an intermediate plate, covering first nozzle body 3 is arranged.

With this arrangement, a respective control chamber 57 for first nozzle needles 5 can be formed via first nozzle body 3 and intermediate plate 73 (and the end of respective gas nozzle needles 5), in other words at the end away from the nozzle on each receptacle 7 for a first nozzle needle 5. Control channel 59 can also be defined as being simple to manufacture with intermediate plate 73 and/or second nozzle body 11. A closing spring can be optionally provided on a respective first nozzle needle 5 that pushes gas nozzle needle 5—for example during down-time of dual fuel fuel-injector 1—into the closed position.

During operation of the inventive dual fuel fuel-injector 1, mixed leakage in the form of gas-containing liquid leakage may occur regularly along or on respective receptacles 7 of first nozzle needles 5. A cause for the mixed leakage emergence can be liquid fuel, originating from a respective control chamber 57 on the outside circumference of a first nozzle needle 5 in the associated receptacle 7 moving slowly in the direction toward gas nozzle chamber 53 (along a slow leakage gap between nozzle needle 5 and receptacle 7), whereas burnable fuel along such a slow leakage gap or guide gap between receptacle 7 and gas nozzle needle 5 can be displaced toward the associate control chamber 57.

To make available such mixed leakage to a mixed leakage treatment, the inventive dual fuel fuel-injector 1 includes a mixed leakage collecting channel 75 which connects the receptacles 7 in a communicating manner. In the design according to FIG. 1, mixed leakage collecting channel 75 is in the embodiment of an annular channel extending in circumferential direction and connecting all receptacles 7 of first nozzle needles 5 in a communicating manner.

Furthermore, according to the invention a mixed leakage discharge channel 77 that is in communication with mixed leakage collecting channel 75 is provided on dual fuel fuel-injector 1 for the intended treatment of the mixed leakage. Via mixed leakage discharge channel 77 and mixed leakage collecting channel 75 the mixed leakage occurring at receptacles 7 can be reliably removed from receptacles 7 and furthermore from first nozzle body 3 or respectively from fuel injector 1, and can be transferred via a (discharge side) outlet 78 of discharge channel 77 to a downstream treatment device, in the embodiment of a pressure regulating device of the type referred to previously.

A design of dual fuel fuel-injector 1 according to FIG. 1—wherein first nozzle body 3 surrounds second nozzle body 11 over a section 11a—allows for a structurally simple provision of mixed leakage collecting channel 75. This will be addressed in further detail below.

On dual fuel fuel-injector 1 according to FIG. 1—see also FIGS. 1A to 5—mixed leakage collecting channel 75 is formed by an indentation or recess, for example by an annular groove. The annular groove is worked into inside circumferential surface 79 of first nozzle body 3, whereby the annular groove on its side opposite the groove bottom, or more specifically opening side is covered by second nozzle body 11 through formation of an all-around enclosed annulus, or more specifically annular channel (that is via the (tapered) end section 11A of second nozzle body 11 (or more specifically its circumferential outside surface), which penetrates the (through) opening of first nozzle body 3). Mixed leakage collecting channel 75, thus formed in a simple manner communicates with a respective receptacle 7 of a first nozzle needle 5 via a bore 81, formed by an easily producible bore (that can be in the form of a diagonal bore, extending radially away from mixed leakage collecting channel 75 toward respective receptacle 7). As is the case with the annular groove, bores 81 can also be laid out in such a design of dual fuel fuel-injector 1 to be easily accessible, originating from inside shell surface 79 of first nozzle body 3.

In increasing the mixed leakage collection volume, it is moreover provided in the embodiment as shown in FIGS. 1-5 to reduce the cross section of a respective first nozzle needle 5 guided in receptacle 7 over its longitudinal center section 83, whereby between the wall of receptacle 7 and tapered section 83 a mixed leakage collecting chamber 85 is provided in the embodiment of an annular chamber. Receptacle 7 communicates with the thus formed mixed leakage collecting chamber 85 and diagonal bore 81 branching off therefrom.

FIG. 1A illustrates more closely the mixed leakage collecting chamber 85 on a first nozzle needle 7, complete with diagonal bore 81.

Figures 2, 3, 4:
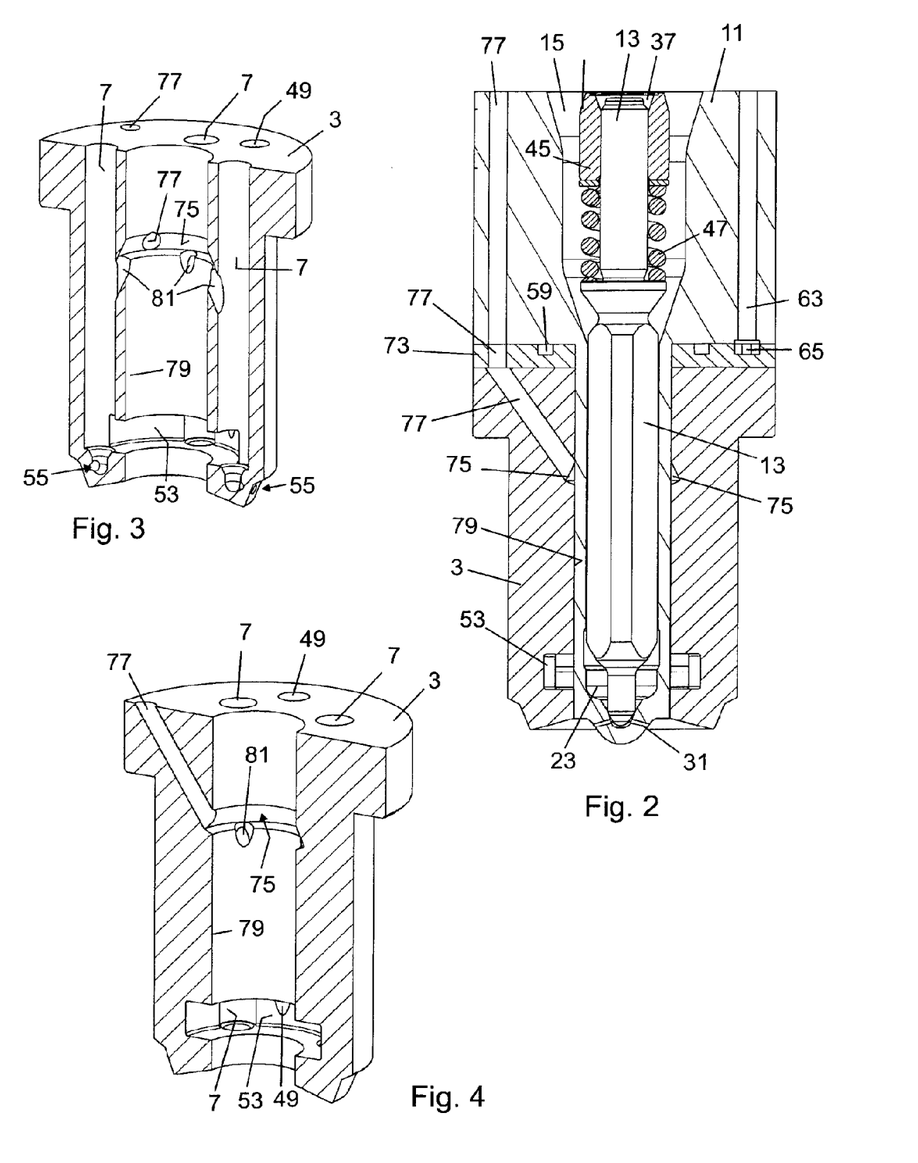
FIG. 2 is an additional sectional view of a nozzle body module of the dual fuel fuel-injector according to FIG. 1.
FIG. 3 is a schematic view of the first nozzle body of the dual fuel fuel-injector according to FIGS. 1 to 2 in a sectional view.
FIG. 4 is an additional section view of the first nozzle body according to the present invention as shown in FIG. 3.

FIG. 2 shows an additional sectional view of dual fuel fuel-injector 1 according to FIG. 1, in particular its nozzle body module that consists of its first 3 and second 11 nozzle body as well as intermediate plate 73. As can be seen in FIG. 2, mixed leakage discharge channel 77 that is in communication with mixed leakage collecting channel 75 is formed through a section in first nozzle body 3 as a diagonal bore, whereby mixed leakage discharge channel 77 extends furthermore through intermediate plate 73 and through second nozzle body 11, each in the form of an axial bore channel.

Figure 5:
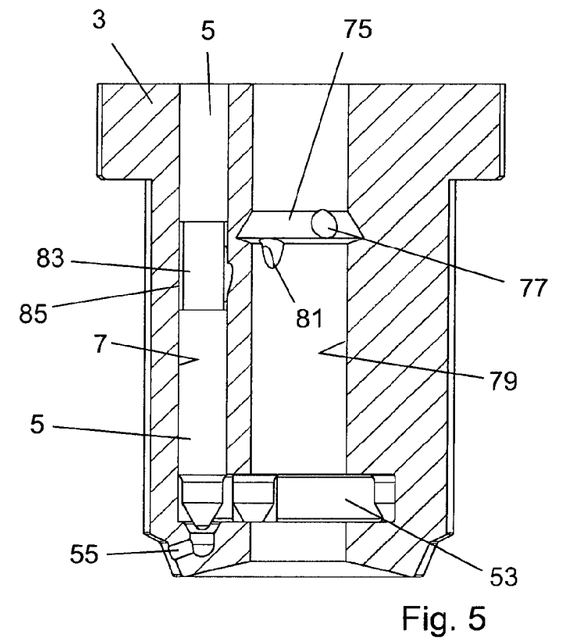
FIG. 5 is a sectional side view of the first nozzle body as shown in FIGS. 3 and 4, with the first nozzle needles seated.

FIGS. 3-5 illustrate more closely additional sectional views of first nozzle body 3 of dual fuel fuel-injector 1 as shown in FIGS. 1 and 2, in particular the cross section of mixed leakage collecting channel 75 or more specifically the ring shaped indentation worked into first nozzle body 3 for the purpose of its formation. In this design, wherein mixed leakage collecting channel 75 has only a small cross section and the connection of receptacles 7 occurs via bores 81, the stability of nozzle body 3 is not appreciably affected, so that mixed leakage collecting channel 75 can be configured advantageously also in structurally weaker regions on first nozzle body 3. First nozzle needle 5 can also be guided over a section above and a section below mixed leakage collecting channel 85 or respectively mixed leakage channel 75 in receptacle 7, along with an effective seal on receptacle 7.

An additional embodiment of dual fuel fuel-injector 1 is explained in further detail below with reference to FIGS. 6-8.

Figure 6:
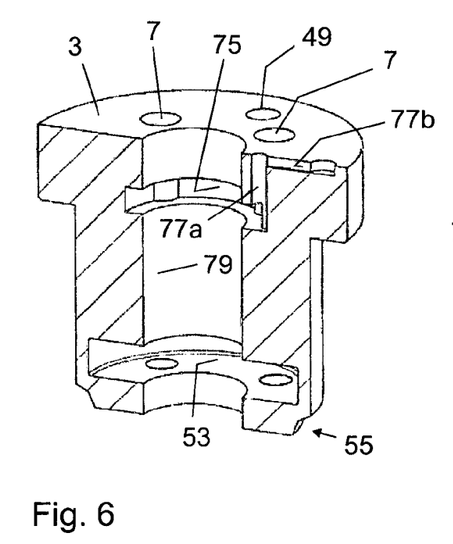
FIG. 6 is a schematic illustration of a first nozzle body of the dual fuel fuel-injector according to an additional embodiment of the invention in a side view.

FIG. 6 shows first nozzle body 3 of the additional embodiment in a sectional view. In contrast to the previously described embodiment according to FIGS. 1-5, first nozzle body 3 is herein provided with a mixed leakage collecting channel 75 that is formed by an annular groove in first nozzle body 3 that directly intersects receptacles 7 of gas needles 5, for example in a longitudinal central region of the same. Separate bores 81 for respective receptacles 7 originating from mixed leakage collecting channel 75 can be dispensable, besides which a large mixed leakage collecting volume in the form of collecting channel 75 is provided.

In contrast to the preceding embodiment, the collecting channel groove with its rectangular shaped cross section is worked deeper into first nozzle body 3, in this respect in a relatively strong material region of nozzle body 3—in the current example in the region of a nozzle body flange. With a simplified manufacture, high stability at continuously reliable control below and above mixed leakage collection channel 75 and good sealing at first nozzle needles 5 is achieved.

Further, in contrast to the embodiment according to FIGS. 1-5, mixed leakage discharge channel 77 in first nozzle body 3 is provided over a section 77A as an axial bore channel that communicates with mixed leakage channel 75 and which subsequently is connected in a communicating and simple manner via a radial section 77B—that is worked into the nozzle-remote end of first nozzle body 3—with an additional axial section in intermediate plate 73 and second nozzle body 11.

Figure 7:
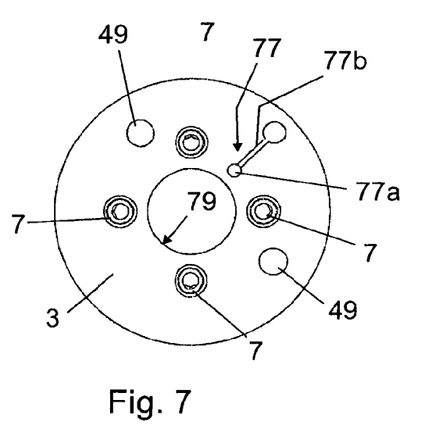
FIG. 7 is a top view of nozzle body according to the embodiment as shown in FIG. 6.

FIG. 7 shows a top view of a thus formed first nozzle body 3.

Figure 8:
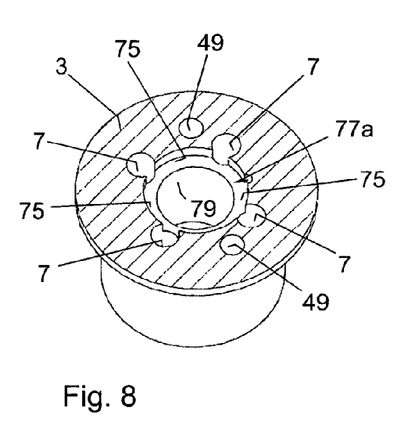
FIG. 8 is a sectional view of the nozzle body as shown in FIGS. 6 and 7 whereby the section is cut through the mixed leakage collecting channel.

FIG. 8 is a sectional view through the plane of mixed leakage annular channel 75, showing in particular the communicating section of receptacles 7 of first nozzle needles 5 via mixed leakage collecting channel 75.

An additional design of dual fuel fuel-injector 1 is described in further detail below with reference to FIGS. 9 and 10.

Figure 9:
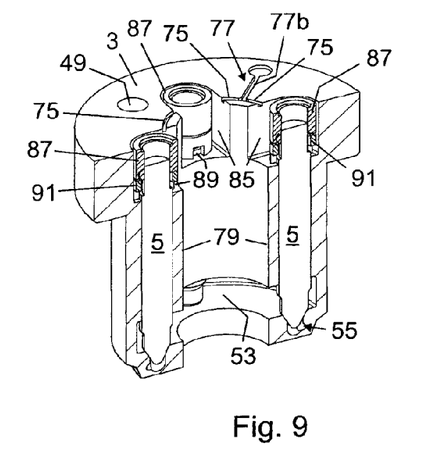
FIG. 9 is a schematic illustration of a first nozzle body of the dual fuel fuel-injector according to an additional embodiment of the invention.

FIG. 9 shows a side view of first nozzle body 3 of the additional embodiment of dual fuel fuel-injector 1 with the therein accommodated first nozzle needles 5.

In this embodiment, mixed leakage channel 75 is formed by a groove that connects receptacles 7 in a communicating manner, this groove is worked into the nozzle-remote face side of first nozzle body 3. The communicating connection of the groove with receptacles 7 is herein realized via mixed leakage collecting chambers 85 which are formed at a respective end away from the nozzle on a receptacle 7 by a cross section enlargement of the same for the provision of a mixed leakage collecting volume.

A respective mixed leakage collecting chamber 85 can herein be worked in a simple manner into first nozzle body 3 originating from the nozzle-remote face side of same, for example as a bore or a different kind of material removal. In this embodiment of dual fuel fuel-injector 1, needle guide sleeves 87 are evidently provided in respective receptacles 7 or more specifically mixed leakage collecting chambers 85 that guide first gas nozzle needles at the end away from the nozzles. Via needle guide sleeves 87 and correspondingly dimensioned end sections of respective first nozzle needles 5, varied control cross sections and/or control chambers 57 can be defined in a more simple manner for first nozzle needles 5.

In order to ensure that gas leakage moving slowly potentially over the leading section of receptacle 7 on receptacle 7, or liquid fuel moving slowly from control chamber 57 in direction toward gas nozzle arrangement 55 can reliably enter into mixed leakage collecting chamber 85, needle guide sleeve 87 can be designed over one section—for example outside control chamber 57—with at least one through-opening 89, for example on its nozzle-near end that is supported on a step of the enlarged cross sectional region. As shown in FIG. 9, a clamping sleeve 91 can be provided alternatively, that pushes needle guide sleeve 87 that is accommodated in the enlarged cross sectional region of receptacle 7 against a covering element 73, for example against intermediate plate 73. Through one of several radial through-openings 89 of clamping sleeve 91 the respective gas or liquid leakage can hereby enter into respective leakage collecting chamber 85 and via the same can enter into mixed leakage channel 75.

To discharge the mixed leakage, mixed leakage collecting channel 75 is again connected in a communicating manner with a mixed leakage discharge channel 77. One section of mixed leakage discharge channel 77 is also formed on the face side of first nozzle body 3 by a radial branch 77B originating from mixed leakage collecting channel 75.

Figure 10:
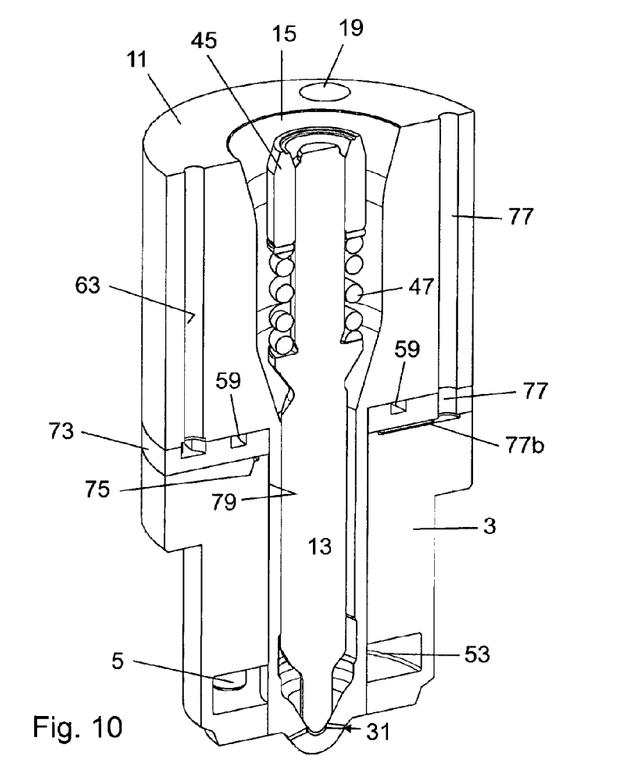
FIG. 10 is a schematic sectional view of the nozzle body module of a dual fuel with a nozzle body according to the embodiment as shown in FIG. 9.

FIG. 10 shows first nozzle body 3 as shown in FIG. 9 with an intermediate plate 73 and a second nozzle body 11, again assembled into a nozzle body module of dual fuel fuel-injector 1. As illustrated in FIG. 10, first nozzle body 3 is covered on the nozzle-remote end by intermediate plate 73, so that mixed leakage collecting channel 75 is formed between first nozzle body 3 and intermediate plate 73. Mixed leakage collecting chambers 85 are hereby further defined in a simplified manner (as surrounded volume); alongside control chamber 57 of first nozzle needles 5 as well as radial section 77b of mixed leakage discharge channel 77. As further illustrated in FIG. 10, mixed leakage discharge channel 77 continues over bore sections further through intermediate plate 73 and second nozzle body 11.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A dual fuel fuel-injector, comprising:
    a first nozzle body having a plurality of respective receptacles;
    a plurality of nozzle needles, each having a stroke that is controllable by a control fluid and at least one associated control chamber, the plurality of nozzle needles including:
        a plurality of first nozzle needles, each being axially displaceable in the first nozzle body of the dual fuel fuel-injector for selective discharge of a first fuel, whereby the plurality of first nozzle needles are arranged in the first nozzle body in the plurality of respective receptacles;
    a mixed leakage collecting channel communicatively connected to the plurality of respective receptacles; and
    a mixed leakage discharge channel on the dual fuel fuel-injector and in communication with the mixed leakage collecting channel.

2. The dual fuel fuel-injector according to claim 1, wherein at least one of said mixed leakage collecting channel is formed on the first nozzle body and said plurality of first nozzle needles are arranged in the first nozzle body, distributed in a circumferential direction of the first nozzle body.

3. The dual fuel fuel-injector according to claim 1, wherein at least one of said plurality of respective receptacles of the plurality of first nozzle needles are entirely communicatively connected via said mixed leakage collecting channel and the mixed leakage collecting channel is an annular channel commutatively connected to said plurality of respective receptacles.

4. The dual fuel fuel-injector according to claim 1, wherein said plurality of nozzle needles include a second nozzle needle that is arranged in a second nozzle body of the dual fuel fuel-injector for selective delivery of a second fuel, said plurality of first nozzle needles each are arranged in the first nozzle body and distributed around the second nozzle body, whereby the first nozzle body surrounds the second nozzle body, and the mixed leakage collecting channel is defined by the first nozzle body and the second nozzle body.

5. The dual fuel fuel-injector according to claim 4, wherein the mixed leakage collecting channel is formed by an indentation that is introduced into a circumferential surface of at least one of the first nozzle body and second nozzle body.

6. The dual fuel fuel-injector according to claim 5, wherein the indentation is covered on an opening side by at least one of said first nozzle body and said second nozzle body.

7. The dual fuel fuel-injector according to claim 1, wherein said mixed leakage collecting channel is defined between the first nozzle body and a face-side cover element on the first nozzle body.

8. The dual fuel fuel-injector according to claim 1, wherein at least one of said mixed leakage collecting channel communicates via a plurality of radial bores with said plurality of respective receptacles of said plurality of first nozzle needles and said mixed leakage collecting channel intersects the plurality of respective receptacles of the plurality of first nozzle needles that are thus communicatively connected.

9. The dual fuel fuel-injector according to claim 1, wherein a mixed leakage collecting chamber is provided on at least one of a respective first nozzle needle of said plurality of first nozzle needles and at least one of said plurality of respective receptacles, through which the plurality of respective receptacles are communicatively connected via the mixed leakage collecting channel.

10. The dual fuel fuel-injector according to claim 9, wherein said mixed leakage collecting chamber is at least one of formed over a section of at least one respective receptacle of said plurality of respective receptacles and formed over a section of a respective first nozzle needle of said plurality of first nozzle needles.

11. The dual fuel fuel-injector according to claim 8, wherein a mixed leakage collecting chamber is formed by an at least partial cross sectional expansion on at least one of said plurality of respective receptacles or a sectional tapering of at least one of said plurality of first nozzle needles.

12. The dual fuel fuel-injector according to claim 8, wherein a mixed leakage collecting chamber is formed surrounding at least one of said plurality of first nozzle needles over a section.

13. The dual fuel fuel-injector according to claim 8, wherein a mixed leakage collecting chamber is formed at an end of at least one of said plurality of respective receptacles away from a nozzle of at least one of said plurality of first nozzle needles.

14. The dual fuel fuel-injector according to claim 9, wherein in at least one respective receptacle of said plurality of respective receptacles of the plurality of first nozzle needles a needle guide sleeve is arranged in said mixed leakage collecting chamber.

15. An internal combustion engine, comprising:
    a dual fuel fuel-injector, including:
        a first nozzle body having a plurality of respective receptacles;
        a plurality of nozzle needles, each having a stroke that is controllable by a control fluid and at least one associated control chamber, the plurality of nozzle needles including:
            a plurality of first nozzle needles, each being axially displaceable in the first nozzle body of the dual fuel fuel-injector for selective discharge of a first fuel, whereby the plurality of first nozzle needles are arranged in the first nozzle body in the plurality of respective receptacles;
        a mixed leakage collecting channel communicatively connected to the plurality of respective receptacles; and
        a mixed leakage discharge channel on the dual fuel fuel-injector and in communication with the mixed leakage collecting channel.

16. The internal combustion engine according to claim 15, wherein at least one of said mixed leakage collecting channel is formed on the first nozzle body and said plurality of first nozzle needles are arranged in the first nozzle body, distributed in a circumferential direction of the first nozzle body.

17. The internal combustion engine according to claim 15, wherein at least one of said plurality of respective receptacles of the plurality of first nozzle needles are entirely communicatively connected via said mixed leakage collecting channel and the mixed leakage collecting channel is an annular channel commutatively connected to said plurality of respective receptacles.

18. The internal combustion engine according to claim 15, wherein said plurality of nozzle needles include a second nozzle needle that is arranged in a second nozzle body of the dual fuel fuel-injector for selective delivery of a second fuel, said plurality of first nozzle needles each are arranged in the first nozzle body and distributed around the second nozzle body, whereby the first nozzle body surrounds the second nozzle body, and the mixed leakage collecting channel is defined by the first nozzle body and the second nozzle body.

19. The internal combustion engine according to claim 18, wherein the mixed leakage collecting channel is formed by an indentation that is introduced into a circumferential surface of at least one of the first nozzle body and second nozzle body.

20. The internal combustion engine according to claim 19, wherein the indentation is covered on an opening side by at least one of said first nozzle body and said second nozzle body.

* * * * *